(12) United States Patent
Kassinger

(10) Patent No.: US 12,575,506 B2
(45) Date of Patent: Mar. 17, 2026

(54) POTTED PLANT STABILIZING DEVICE

(71) Applicant: Jackie Kassinger, Fair Oaks Ranch, TX (US)

(72) Inventor: Jackie Kassinger, Fair Oaks Ranch, TX (US)

( * ) Notice: Subject to any disclaimer, the term of this patent is extended or adjusted under 35 U.S.C. 154(b) by 42 days.

(21) Appl. No.: 18/538,233

(22) Filed: Dec. 13, 2023

(65) Prior Publication Data

US 2025/0194472 A1 Jun. 19, 2025

(51) Int. Cl.
*A01G 9/12* (2006.01)

(52) U.S. Cl.
CPC .................................... *A01G 9/124* (2013.01)

(58) Field of Classification Search
CPC ................................. A01G 9/124; A01G 9/12
See application file for complete search history.

(56) References Cited

U.S. PATENT DOCUMENTS

| | | | | |
|---|---|---|---|---|
| 1,942,975 | A * | 1/1934 | Polgar | A01G 9/124 47/47 |
| 2,152,018 | A * | 3/1939 | Barnhart | A01G 9/12 256/65.09 |
| 2,501,255 | A * | 3/1950 | Bell | A01G 17/04 47/42 |
| 4,074,461 | A | 2/1978 | Hirschman | |
| 4,143,460 | A * | 3/1979 | Shean | B23Q 11/0825 30/151 |
| 4,318,228 | A * | 3/1982 | Kimura | G01B 3/08 33/809 |
| 5,159,780 | A | 11/1992 | Molthen | |
| 5,542,210 | A * | 8/1996 | Hupfl | A01G 9/12 47/47 |
| 5,950,359 | A * | 9/1999 | Pivnik | A01G 17/04 47/42 |
| 6,612,071 | B1 * | 9/2003 | Steadman | A01G 17/04 248/525 |
| 6,991,203 | B2 * | 1/2006 | Steadman | A01G 17/04 248/230.8 |
| D660,103 | S | 5/2012 | Bryanton | |
| 9,510,519 | B2 | 12/2016 | Hertlein | |
| 10,111,393 | B1 | 10/2018 | Escobedo | |
| 11,464,174 | B1 | 10/2022 | Suteerawanit | |
| 2009/0272032 | A1 | 11/2009 | Kiff, Sr. | |
| 2017/0160624 | A1 * | 6/2017 | Boushell | G03B 17/561 |
| 2017/0181385 | A1 | 6/2017 | Daniel | |
| 2017/0347536 | A1 | 12/2017 | Williams | |
| 2020/0077600 | A1 | 3/2020 | Shemwell | |
| 2022/0362926 | A1 * | 11/2022 | Gannon | B25J 18/025 |
| 2024/0377158 | A1 * | 11/2024 | Gorton | F41C 33/007 |
| 2025/0032858 | A1 * | 1/2025 | Lee | A63B 27/00 |

FOREIGN PATENT DOCUMENTS

WO WO2023101979 6/2023

\* cited by examiner

*Primary Examiner* — Jessica B Wong

(57) ABSTRACT

A potted plant stabilizing device includes a collar arrangement and legs. The collar arrangement is designed to fit around and hold a trunk or stem of a potted plant in an upright, stable position. The legs are designed to detachably connect the collar arrangement to a rim of a pot to minimize or prevent displacement of the collar arrangement. The collar arrangement includes a collar, which is made at least in part from a hard plastic or metal material or combination thereof. The collar is adjustable between a minimum and maximum diameter to accommodate trunks or stems of potted plants of different diameters.

8 Claims, 7 Drawing Sheets

POTTED PLANT STABILIZING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

Background of the Invention

(1) Field of the Invention

The disclosure relates to potted plant stabilizing devices and more particularly pertains to a new potted plant stabilizing device that is easily adjustable. For potted plants there can be a number of circumstances where the plant itself is not stable in the pot and thus risks leaning or falling over and becoming damaged or dying. For example, it is common for the plants to grow beyond their current pot, which can result in the plant becoming larger than the root system or soil can support the plant in a stable, upright or vertical position. Most stabilizing devices are simply wooden stakes with ties or similar, which are cumbersome to install and often need to be replaced or re-positioned, especially if the soil is shallow or soft. They also risk damaging the plant and/or the root system. The stake-and-tie system usually only provides support on one or two sides of the plant, and thus the plant can lean or move toward an unsupported area.

(2) Description of Related Art Including Information Disclosed Under 37 CFR 1.97 and 1.98

The prior art relates to plant stabilizing devices, predominantly for supporting vines or branches growing from a stem or trunk. The prior art does not disclose a potted plant stabilizing device that includes a collar made from hard plastic or metal that is adjustable in diameter.

BRIEF SUMMARY OF THE INVENTION

An embodiment of the disclosure meets the needs presented above by generally comprising a potted plant stabilizing device includes a collar arrangement and legs. The collar arrangement is designed to fit around and hold a trunk or stem of a potted plant in an upright, stable position. The legs are designed to detachably connect the collar arrangement to a rim of a pot to minimize or prevent displacement of the collar arrangement. The collar arrangement includes a collar, which is made at least in part from a hard plastic or metal material or combination thereof. The collar is adjustable between a minimum and maximum diameter to accommodate trunks or stems of potted plants of different diameters. By using the collar arrangement and legs, the collar arrangement can provide essentially 360-degree support to the stem or trunk of a plant. By using a collar that is made from hard plastic or metal, and that is also adjustable in diameter, the collar can provide firm support and a strong connection to the legs and the pot, but also provide the adjustability needed to accommodate trunks or stems of different diameters.

In accordance with at least one possible embodiment, each of the legs includes a clamp structure at one end designed to detachably clamp or snap its leg onto the collar. Each of the legs comprises a gripping structure at the opposite end designed to be pressed onto a rim of a pot in a form or press fit. The gripping structure is substantially C-shaped and includes two gripping arms. Each of the gripping arms includes a resilient material to permit the gripping arms to be temporarily deformed and spread apart upon placement of the gripping structure on a rim of a pot to generate increased gripping force and permit placement on rims of different dimensions. In other words, the opening between the gripping arms is relatively small and preferably smaller than the rims of most pots for plants. Consequently, when the gripping arm is pressed onto the rim, the arms are displaced and thereby increase the clamping or gripping effect and permit placement of the legs on various types of pot rims of different designs and dimensions. Each of the legs can also include a first section and a second section that are movably adjustable with respect to one another in a telescoping manner to permit adjustment of the length of each of the legs. Once the desired length is achieved, the legs can be locked in place using pin-and-hole locking arrangement.

In accordance with at least one possible embodiment, the collar arrangement includes projections disposed to project substantially radially inwardly from the collar to contact a trunk or stem of a potted plant and maintain at least a portion of the collar a distance from the trunk or stem. The projections can be either separate from or formed integrally with the collar. These projections can be in the form of flanges that can provide a very stable but minimal contact between the collar and the plant to thereby protect the plant from being damaged by prolonged contact over a larger area.

Since the collar is relatively solid or stiff, the collar includes a first open end and a second open end that are disposed adjacent and disconnected from one another to permit opening of the collar to permit placement of the collar around a trunk or stem of a potted plant. In addition, in accordance with at least one possible embodiment, the collar includes collar sections, such as two, three, four or more sections. The collar arrangement includes connectors that are designed and positioned to movably connect the sections to permit opening and closing of the collar. In addition, each of the connectors includes or is in the form of a telescoping piece designed to permit adjustment of the distance between adjacent collar sections and permit adjustment of the diameter of the collar. The collar sections can thereby be moved apart and together while still being connected by the connectors.

In accordance with at least one possible embodiment, each of the collar sections includes one of the projections to place each of the collar sections in stabilizing contact with a trunk or stem of a potted plant. Each of the collar sections includes a recessed portion disposed adjacent the projection of its collar section. The clamp structure of each of the legs is designed to clamp onto a corresponding collar section at the recessed portion to provide stabilizing force at the projections. Since the collar is contacting the trunk or stem via the projections, it is advantageous to connect the legs at or near the projections to provide the stabilizing force where the collar contacts the plant. In accordance with at least one possible embodiment, each of the projections includes a first projecting flange and a second projecting flange disposed on either side of its corresponding recessed portion. The separated flanges provide more stable but yet minimal contact with the plant.

To utilize the potted plant stabilizing device, the user opens the collar and then closes the collar around a trunk or stem of a potted plant. The user can adjust the diameter of the collar to accommodate the trunk or stem of the potted plant, such that the projections contact the trunk or stem. The user can then detachably connect the collar arrangement to a rim of a pot using the legs, which legs can be detachably connected to the collar before or after placement of the collar on the plant. The user can also adjust the length of the legs to a desired length. In accordance with at least one possible embodiment, the connectors between the collar sections can allow for a passive adjustment of each of the collar sections upon growth of the plant. To further explain, as the plant grows, the diameter of the trunk or stem could increase. Since the potted plant stabilizing device is relatively stiff or rigid overall, the projections could end up digging into or cutting the trunk or stem as it increases. However, since the collar sections are connected by telescoping connectors, the collar could automatically expand to match a corresponding increase in the diameter of the trunk or stem to minimize or prevent damage to the plant by the collar. Such an expansion would not be unlimited due to the reinforcing effect of the legs, but some expansion would be possible to permit the user time to re-adjust the potted plant stabilizing device as needed with minimal risk of substantial damage to the plant.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
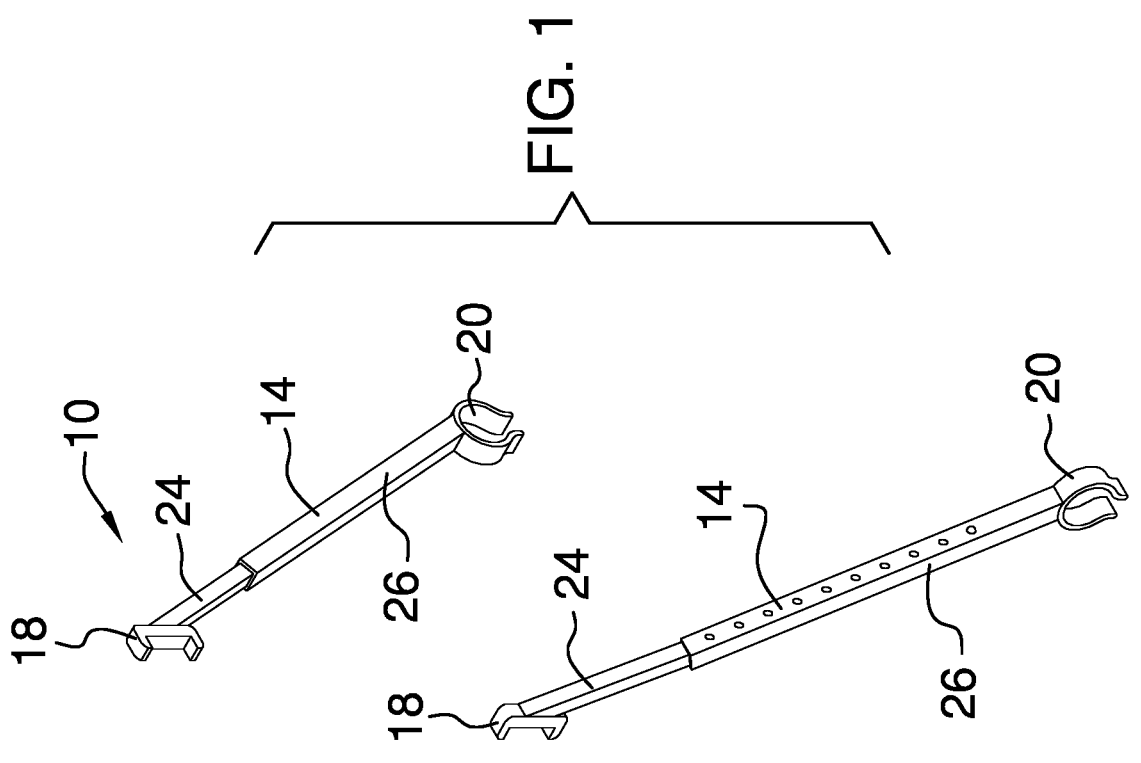
FIG. 1 is a perspective view of components of a potted plant stabilizing device according to an embodiment of the disclosure.
Figure 1:
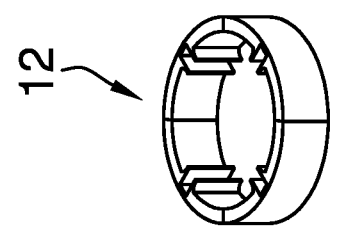
Figure 1:
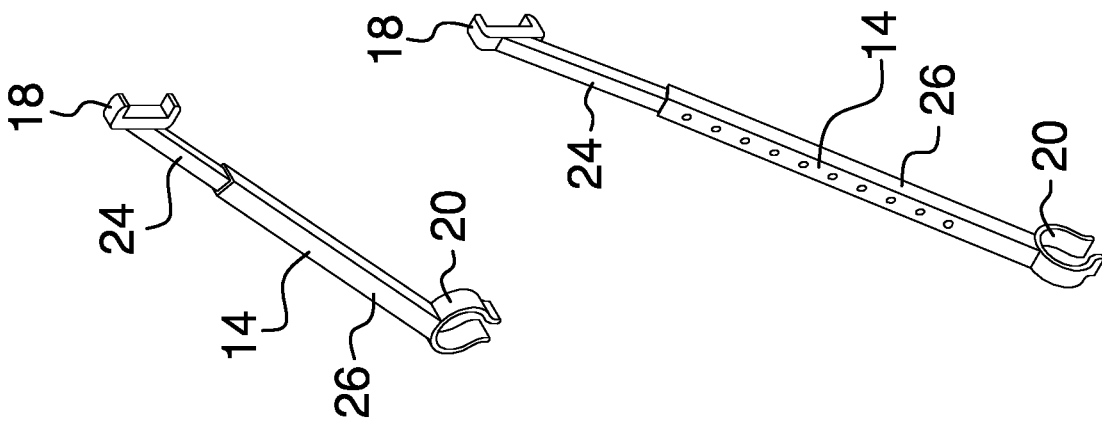

With reference now to the drawings, and in particular to FIGS. 1 through 7 thereof, a new potted plant stabilizing device embodying the principles and concepts of an embodiment of the disclosure and generally designated by the reference numeral 10 will be described.

As best illustrated in FIGS. 1 through 7, the potted plant stabilizing device 10 generally comprises a collar arrangement 12 and legs 14. The collar arrangement 12 is designed to fit around and hold a trunk 52 or stem of a potted plant in an upright, stable position. The legs 14 are designed to detachably connect the collar arrangement 12 to a rim 56 of a pot 54 to minimize or prevent displacement of the collar arrangement 12. The collar arrangement 12 includes a collar 16, which is made at least in part from a hard plastic or metal material or combination thereof. The collar 16 is adjustable between a minimum and maximum diameter to accommodate trunks or stems of potted plants of different diameters.

Figure 5:
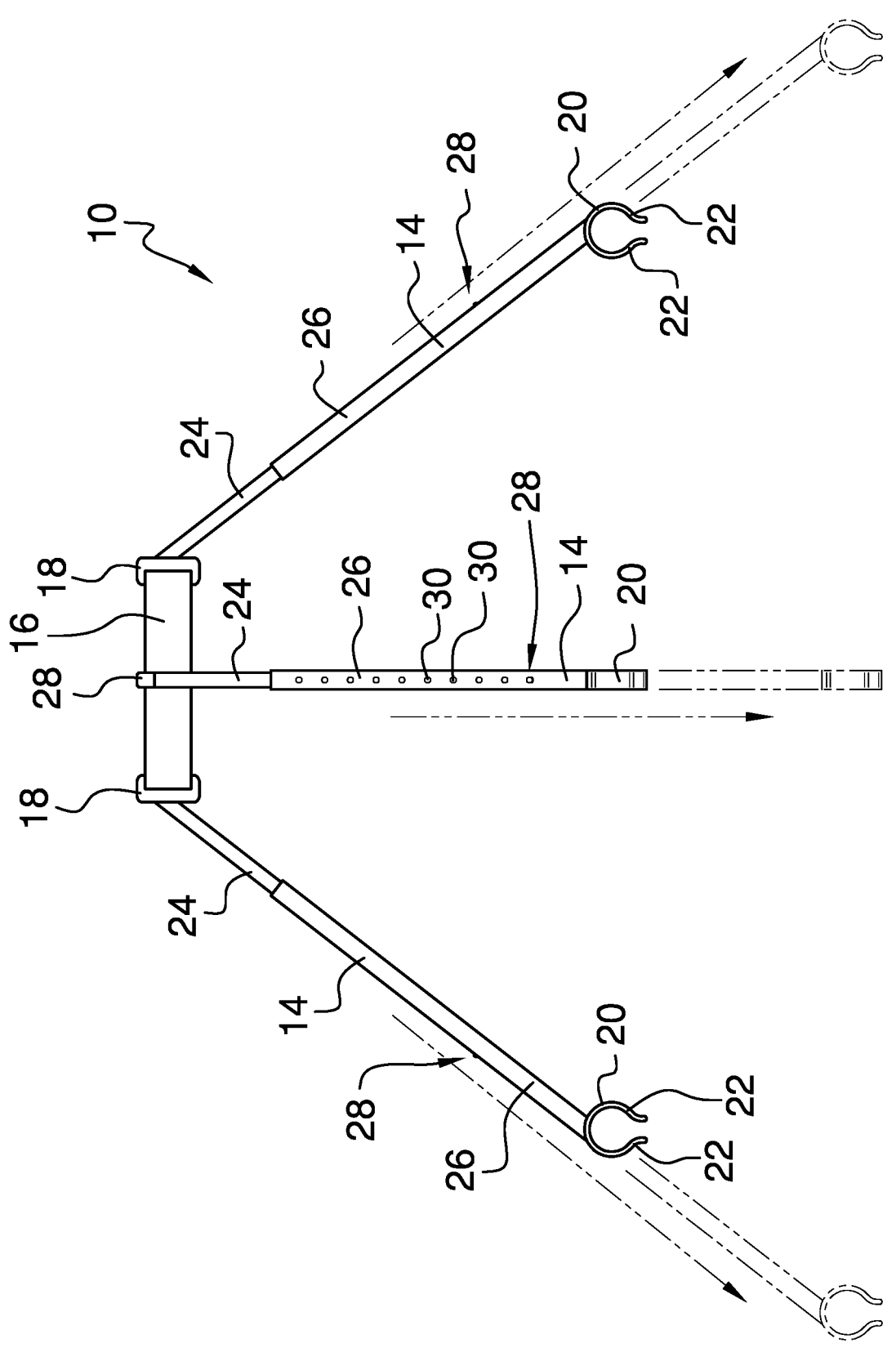
FIG. 5 is a side view of the potted plant stabilizing device.

Each of the legs 14 includes a clamp structure 18 at one end designed to detachably clamp or snap its leg onto the collar 16. Each of the legs 14 comprises a gripping structure 20 at the opposite end designed to be pressed onto the rim 56 of the pot 54 in a form or press fit. The gripping structure 20 is substantially C-shaped and includes two gripping arms 22. As shown in FIG. 5, each of the legs 14 includes a first section 24 and a second section 26 that are movably adjustable with respect to one another in a telescoping manner to permit adjustment of the length of each of the legs 14. Once the desired length is achieved, the legs 14 can be locked in place using pin-and-hole locking arrangement in which a pin 28 projects through an aperture 30 selected by the user.

Figure 6:
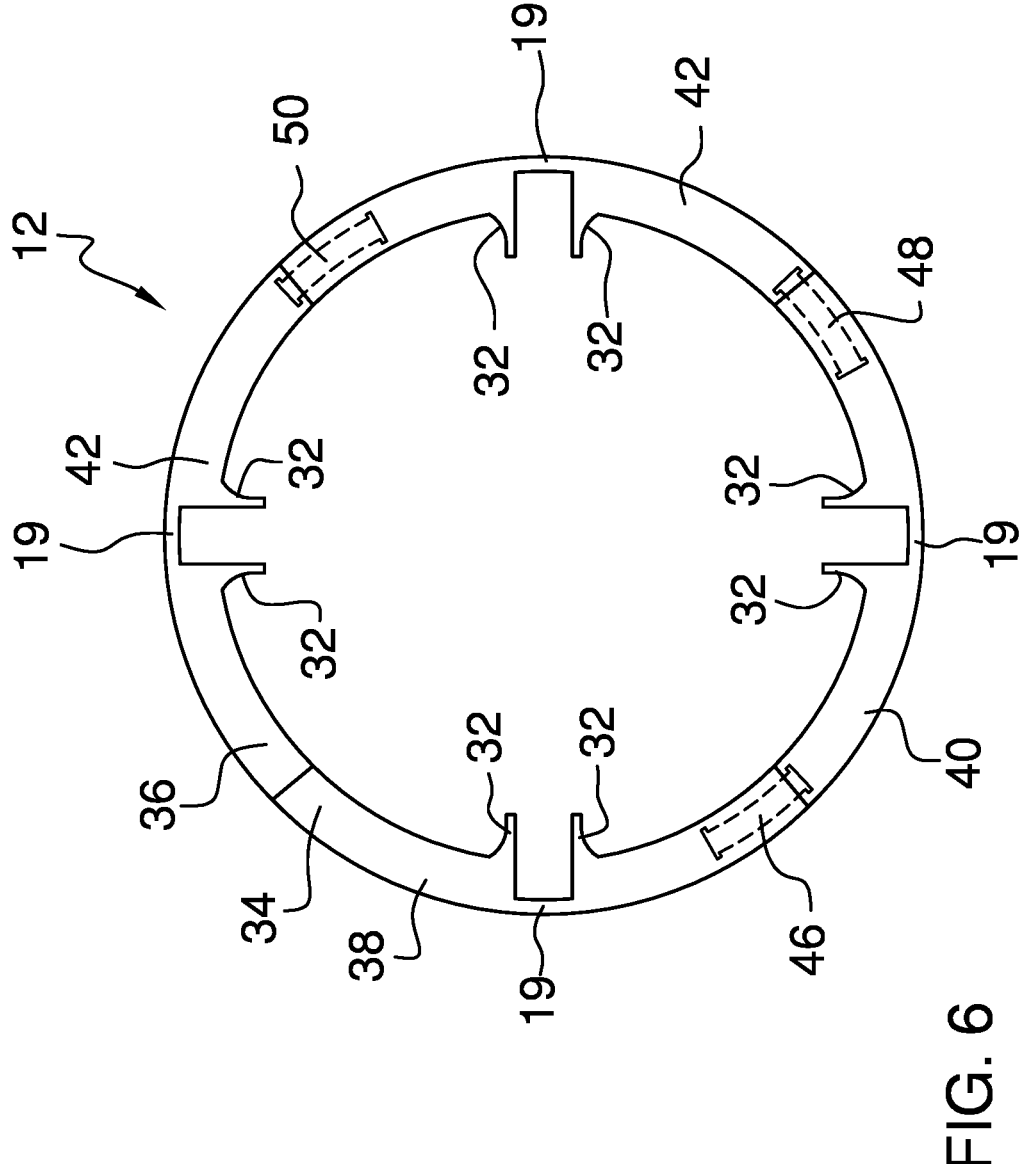
FIG. 6 is a top view of a collar of the potted plant stabilizing device.
Figure 7:
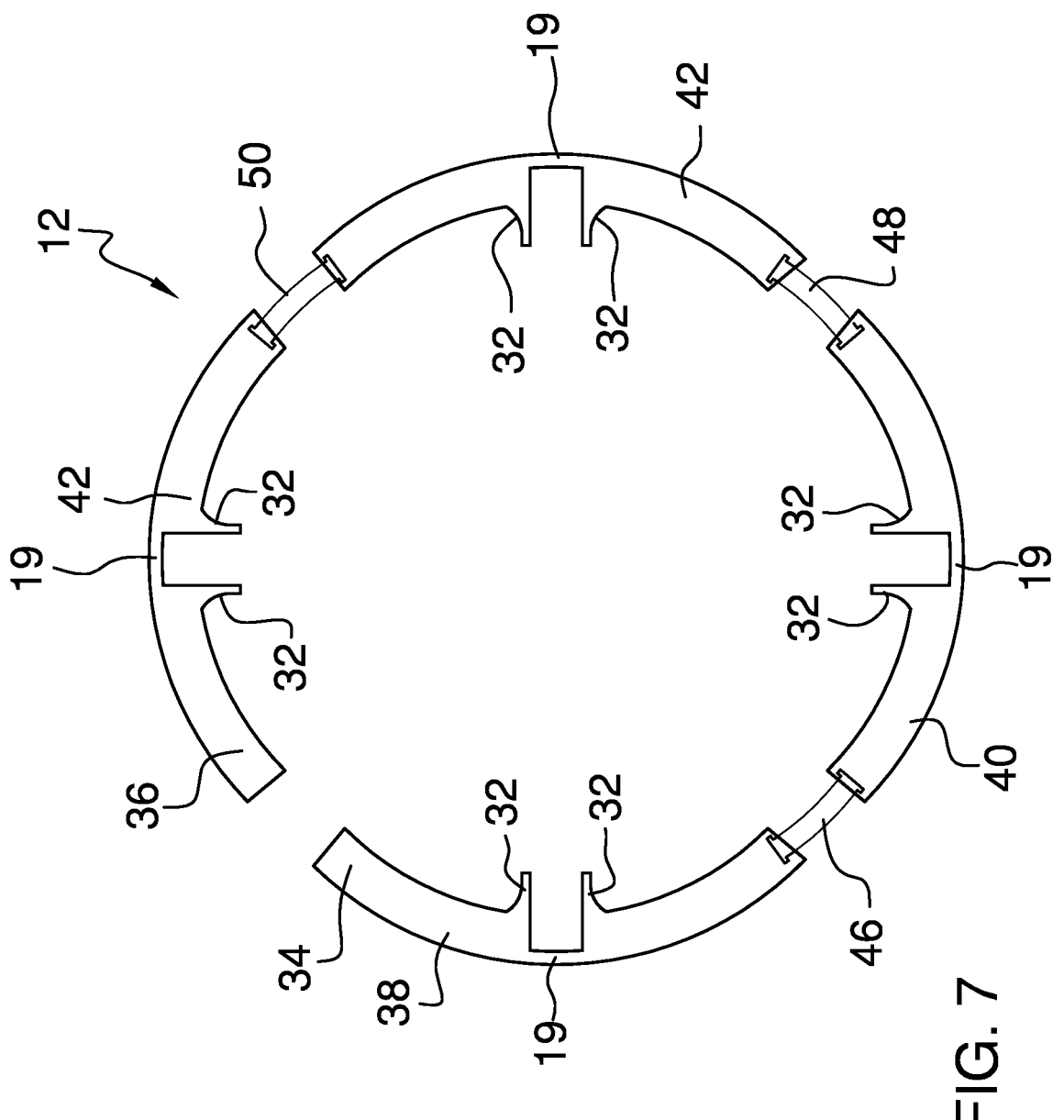
FIG. 7 is a top view of a collar of the potted plant stabilizing device.

The collar arrangement 12 includes projections 32 disposed to project substantially radially inwardly from the collar 16. These projections 32 can be in the form of flanges that can provide a very stable but minimal contact between the collar 16 and the plant 50. As shown in FIGS. 6 and 7, the collar 16 includes a first open end 34 and a second open end 36 that are disposed adjacent and disconnected from one another to permit opening of the collar 16 to permit placement of the collar 16 around a trunk 52 of a potted plant. In the embodiment shown, the collar 16 is divided into a first collar section 38, a second collar section 40, a third collar section 42, and a fourth collar section 44. The first collar section 38 is adjustably connected to the second collar section 40 by a first connector 46. The second collar section 40 is adjustably connected to the third collar section 42 by a second connector 48. The third collar section 42 is adjustably connected to the fourth collar section 44 by a third connector 50. The first collar section 38 includes the first open end 34 of the collar 16 and the fourth collar section 44 includes the second open end 36 of the collar 16.

Figure 2:
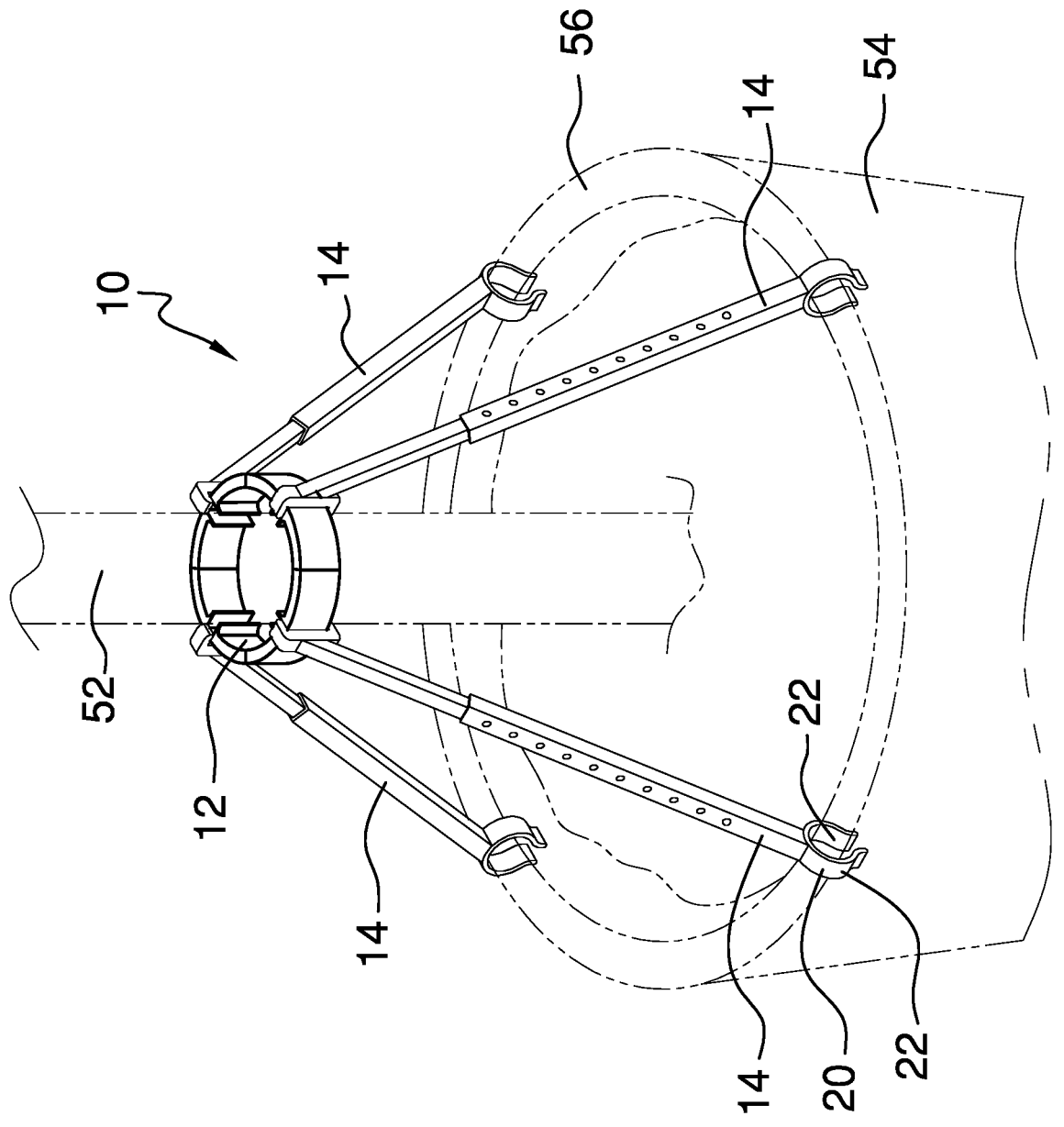
FIG. 2 is a perspective view of the potted plant stabilizing device installed on a plant.
Figure 3:
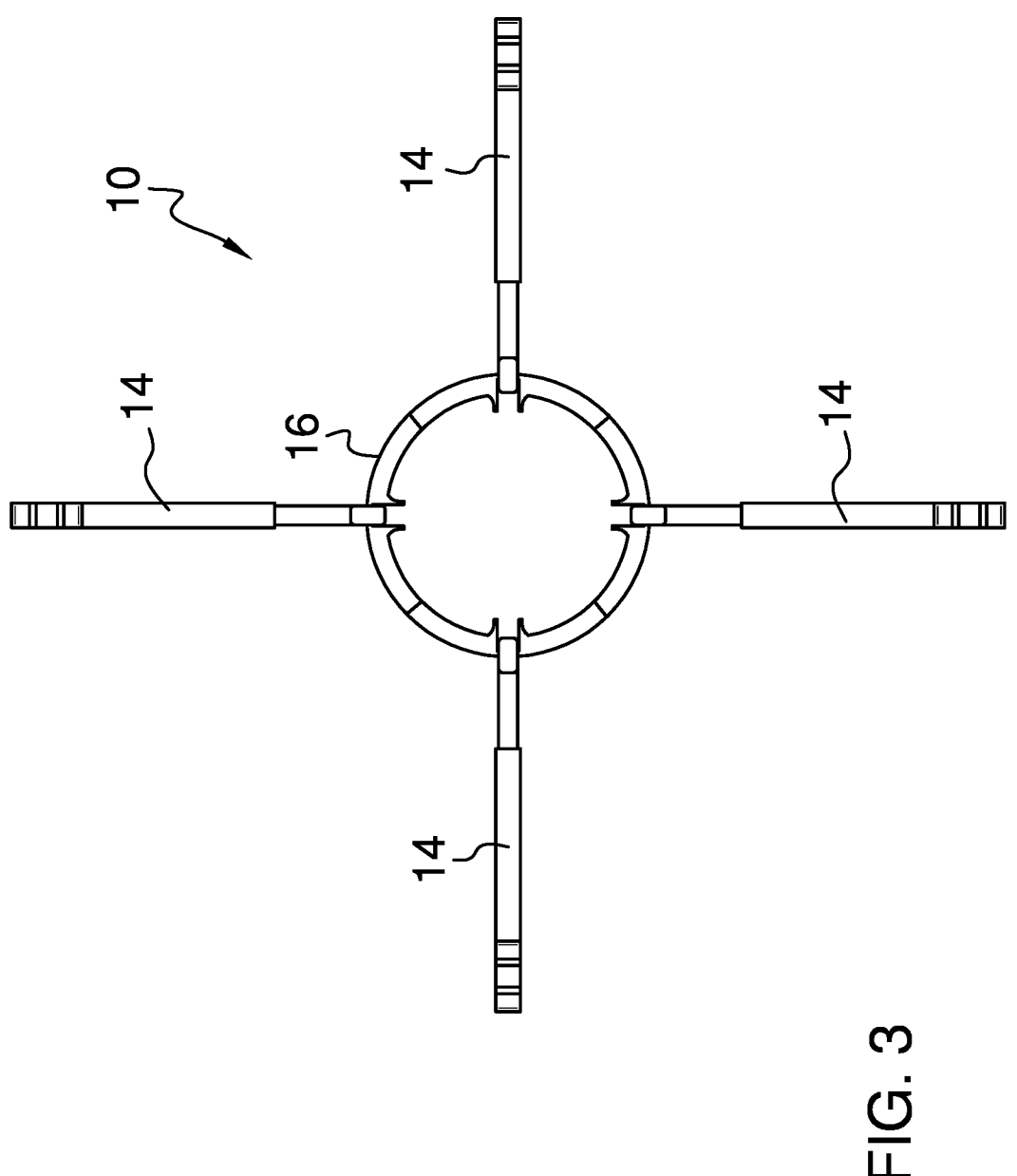
FIG. 3 is a bottom view of the potted plant stabilizing device.
Figure 4:
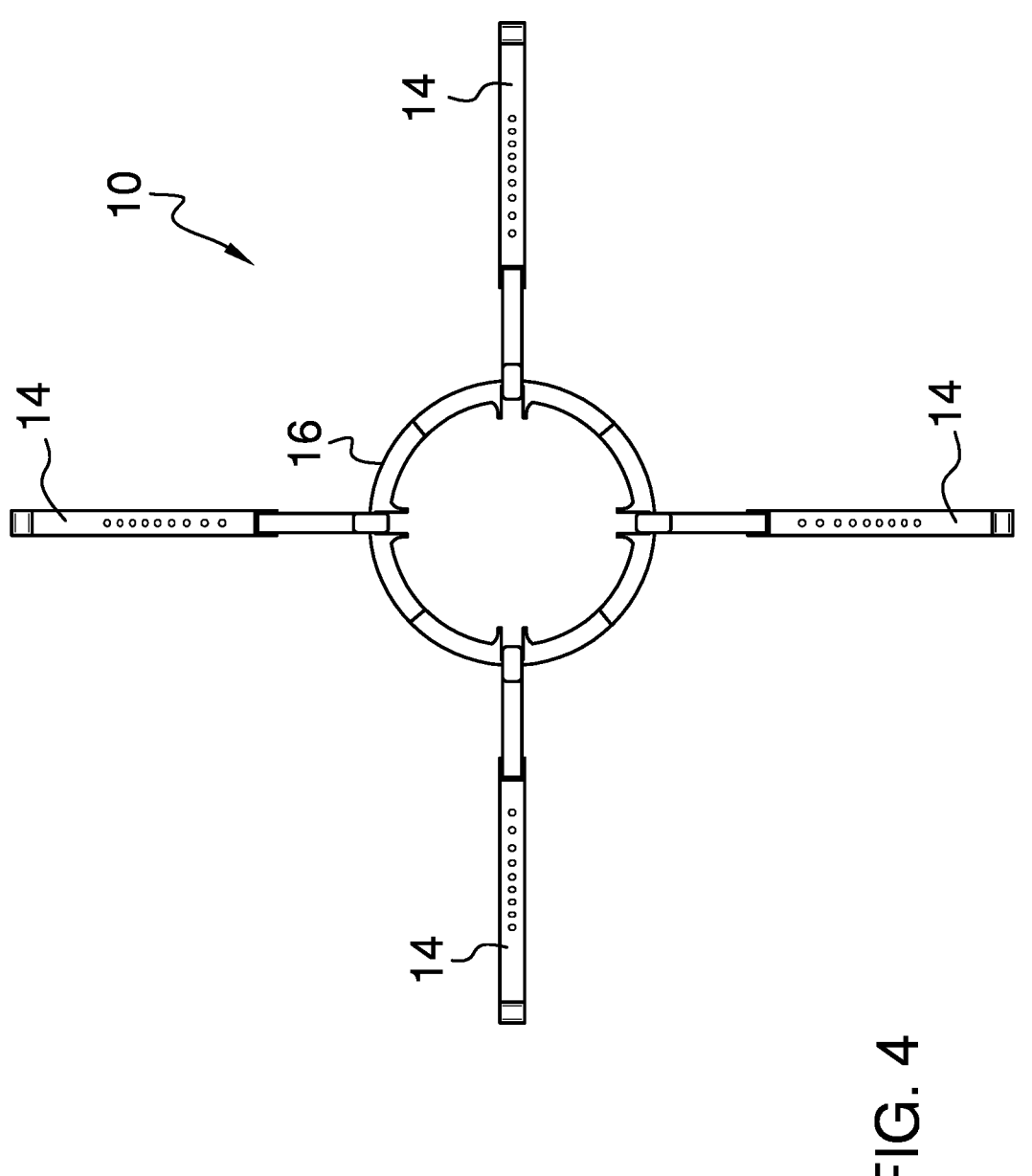
FIG. 4 is a top view of the potted plant stabilizing device.

As shown in FIG. 2, each of the collar sections 38, 40, 42, 44 includes one of the projections 32 to place each of the collar sections 38, 40, 42, 44 in stabilizing contact with the trunk 52. Each of the collar sections 38, 40, 42, 44 includes a recessed portion 19 disposed adjacent the projections 32. The clamp structures 18 clamp onto the collar sections 38, 40, 42, 44 at the recessed portions 19 to provide stabilizing force at the projections 32.

To utilize the potted plant stabilizing device 10, a user opens the collar 16 and then closes the collar 16 around the trunk 52. As shown in FIGS. 6 and 7, the user can adjust the diameter of the collar 16 to accommodate the trunk 52. As shown in FIG. 2, the user can then detachably connect the collar arrangement 12 to the rim 56 of the pot 54 using the legs 14 and the gripping structures 20. The user can also adjust the length of the legs 14 to a desired length, as shown in FIG. 5.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A potted plant stabilizing device comprising:

a collar arrangement configured to fit around and hold a trunk or stem of a potted plant in an upright, stable position;

legs configured to detachably connect said collar arrangement to a rim of a pot to minimize or prevent displacement of said collar arrangement;

said collar arrangement comprising a collar comprising plastic or metallic material;

said collar being adjustable between a minimum and maximum diameter to accommodate trunks or stems of potted plants of different diameters; and said collar arrangement comprises projections disposed to project substantially radially inwardly from said collar to contact a trunk or stem of a potted plant and maintain said collar a distance from the trunk or stem, such that the collar is in contact with the trunk or stem via the projections;

wherein each of said legs comprises a clamp structure configured to detachably clamp or snap its leg onto said collar;

wherein said collar comprises a first open end and a second open end being disposed adjacent and disconnected from one another to permit opening of said collar to permit placement of said collar around a trunk or stem of a potted plant;

wherein said collar comprises collar sections;

wherein said collar arrangement comprises connectors configured and disposed to movably connect said sections to permit opening and closing of said collar;

wherein each of said connectors comprises a telescoping piece configured and disposed to permit adjustment of the distance between adjacent collar sections and permit adjustment of the diameter of said collar;

wherein each of said legs comprises a gripping structure configured to be pressed onto a rim of a pot in a form or press fit;

wherein said gripping structure is substantially C-shaped and comprises two gripping arms;

wherein each of said gripping arms comprises a resilient material to permit said gripping arms to be temporarily deformed and spread apart upon placement of said gripping structure on a rim of a pot to generate increased gripping force and permit placement on rims of different dimensions;

wherein each of said collar sections comprises one of said projections to place each of said collar sections in stabilizing contact with a trunk or stem of a potted plant;

wherein each of said collar sections comprises a recessed portion disposed adjacent said projection of its collar section; and wherein said clamp structure of each of said legs is configured to clamp onto a corresponding collar section at said recessed portion to provide stabilizing force at said projections.

2. The potted plant stabilizing device according to claim 1, wherein each of said legs comprises a first section and a second section being movably adjustable with respect to one another in a telescoping manner to permit adjustment of the length of each of said legs.

3. The potted plant stabilizing device according to claim 2, wherein each of said projections comprises a first projecting flange and a second projecting flange disposed on either side of its corresponding recessed portion.

4. The potted plant stabilizing device according to claim 3, wherein:

said collar sections comprise a first collar section, a second collar section, third collar section, and a fourth collar section;

said connectors comprise a first connector, a second connector, and a third connector;

said legs comprise a first leg, a second leg, a third leg, and a fourth leg, each being configured to detachably connect its corresponding first collar section, second collar section, third collar section, and fourth collar section to a pot;

said first collar section is adjustably connected to said second collar section by said first connector;

said second collar section is adjustably connected to said third collar section by said second connector;

said third collar section is adjustably connected to said fourth collar section by said third connector; and said first collar section comprises said first open end of said collar and said fourth collar section comprises said second open end of said collar.

5. The potted plant stabilizing device according to claim 1, wherein:

said collar comprises collar sections;

said collar arrangement comprises connectors configured and disposed to movably connect said sections to permit opening and closing of said collar; and each of said connectors comprises a telescoping piece configured and disposed to permit adjustment of the distance between adjacent collar sections and permit adjustment of the diameter of said collar.

6. A potted plant stabilizing device comprising:

a collar arrangement configured to fit around and hold a trunk or stem of a potted plant in an upright, stable position;

legs configured to detachably connect said collar arrangement to a rim of a pot to minimize or prevent displacement of said collar arrangement;

said collar arrangement comprising a collar comprising plastic or metallic material;

said collar being adjustable between a minimum and maximum diameter to accommodate trunks or stems of potted plants of different diameters;

said collar comprises collar sections;

said collar arrangement comprises connectors configured and disposed to movably connect said sections to permit opening and closing of said collar;

each of said connectors comprises a telescoping piece configured and disposed to permit adjustment of the distance between adjacent collar sections and permit adjustment of the diameter of said collar;

each of said collar sections comprises a projection disposed to project substantially radially inwardly from said collar to contact a trunk or stem of a potted plant and maintain said collar sections a distance from the trunk or stem;

each of said collar sections comprises a recessed portion disposed adjacent said projection of its collar section;

each of said legs is configured to clamp onto a corresponding collar section at said recessed portion to provide stabilizing force at said projections; and each of said projections comprises a first projecting flange and a second projecting flange disposed on either side of its corresponding recessed portion.

7. The potted plant stabilizing device according to claim 5, wherein:

said collar sections comprise a first collar section, a second collar section, a third collar section, and a fourth collar section;

said connectors comprise a first connector, a second connector, and a third connector;

said legs comprise a first leg, a second leg, a third leg, and a fourth leg, each being configured to detachably connect its corresponding first collar section, second collar section, third collar section, and fourth collar section to a pot;

said first collar section is adjustably connected to said second collar section by said first connector;

said second collar section is adjustably connected to said third collar section by said second connector;

said third collar section is adjustably connected to said fourth collar section by said third connector; and said first collar section comprises said first open end of said collar and said fourth collar section comprises said second open end of said collar.

8. The potted plant stabilizing device according to claim 1, wherein:

each of said legs comprises a gripping structure configured to be pressed onto a rim of a pot in a form or press fit;

said gripping structure is substantially C-shaped and comprises two gripping arms; and each of said gripping arms comprises a resilient material to permit said gripping arms to be temporarily deformed and spread apart upon placement of said gripping structure on a rim of a pot to generate increased gripping force and permit placement on rims of different dimensions.

\* \* \* \* \*